United States Patent Office 3,382,508
Patented May 14, 1968

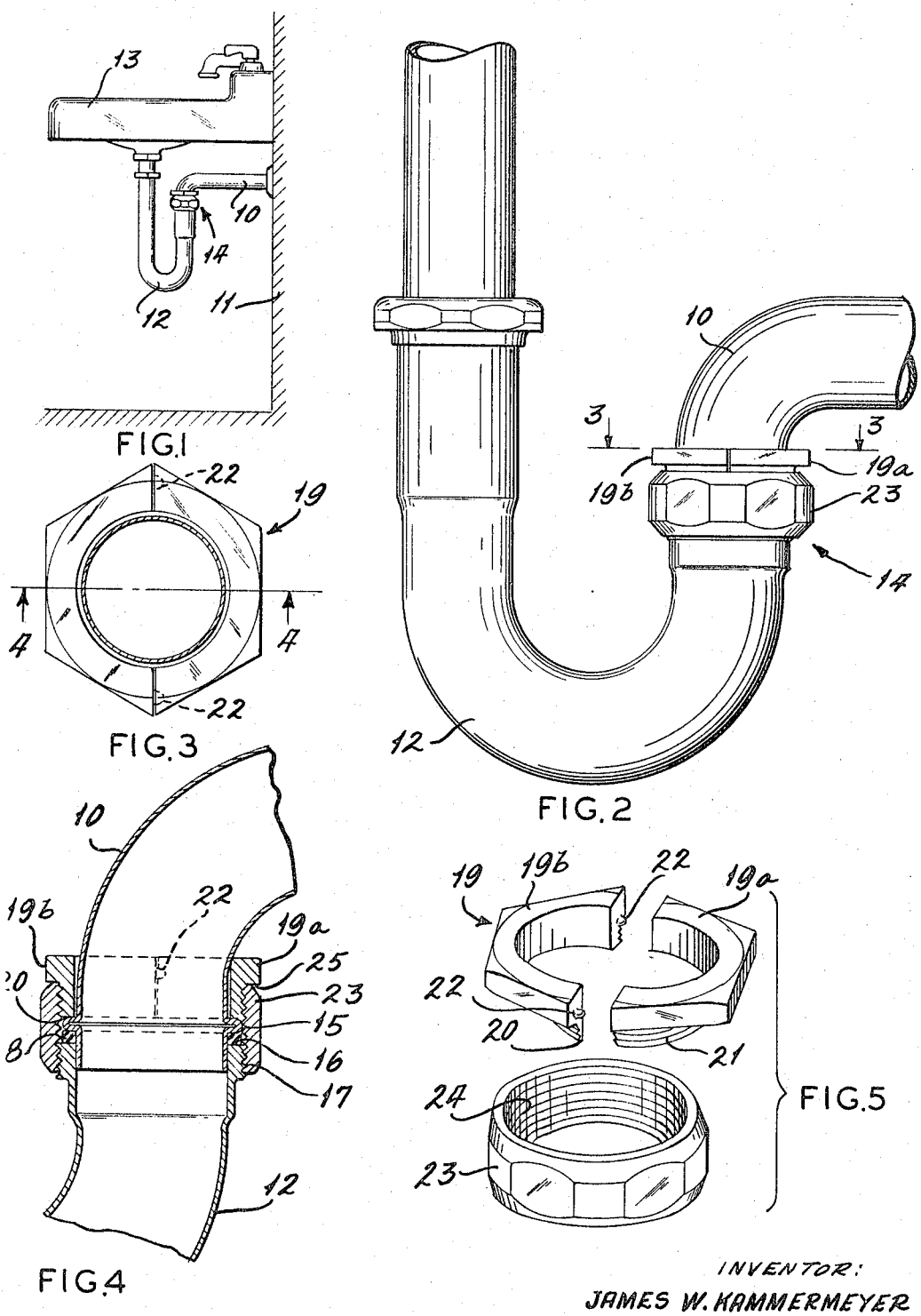

3,382,508
SANITARY TRAP JAMNUT REPAIR UNIT
James W. Kammermeyer, 7519 Forest View Drive,
Normandy, Mo. 63121
Filed Dec. 3, 1965, Ser. No. 511,464
2 Claims. (Cl. 4—191)

ABSTRACT OF THE DISCLOSURE

A repair unit for repairing sanitary trap lines in which one pipe is permanently attached to a structural member of the building, including a split ring sleeve which is fitted around the fixed pipe section and bears against a flange on the pipe and a solid threaded nut adapted to engage the threaded sleeve and the threaded lower pipe section so as to engage the pipe sections and compress a seal interposed between the pipe sections.

Disclosure

The present invention relates to a device for repairing sanitary trap lines and particularly relates to a three-piece unit for repairing sanitary plumbing traps on kitchen sinks or bathroom lavatories where the connecting sanitary L-plumbing pipe is permanently attached to a structural member of the building.

In most homes, the connection between the trap on the kitchen sink or the bathroom lavatory is connected to a pipe permanently fixed in the room wall. The permanently fixed wall pipe has a flange against which a seal is seated and a conventional nut is adapted to engage the seal and urge the same against the upper surface of the flange when secured onto a threaded end of the J-shaped trap portion to seal the members together. This joint is very susceptible to corrosion and while the nut can be backed off and the rubber gasket replaced, oftentimes the nut itself becomes so corroded that it splits when it is turned down against the flange of the fixed pipe member. When this happens, it is impossible to replace the nut without displacing the pipe, since the nut cannot fit over the pipe flange and the pipe is permanently fixed into the wall. Accordingly, repair of this problem becomes a major plumbing matter since the fixed pipe must be removed or cut.

Therefore, it is a principal object of the present invention to provide a replacement unit whereby the J-shaped trap member connected to the sink or lavatory can be reattached to the L-pipe member fixed to the wall.

A further object of the present invention is to provide an inexpensive, easily constructed and installed device for replacing and repairing sink trap connections, said device being useable by amateur as well as professional plumbers.

These and other objects and advantages will become apparent hereinafter.

The present invention comprises a split ring member adapted to engage the flange on a fixed pipe and a threaded sleeve engaging the split ring and a threaded flange on a sink trap pipe member so as to fasten the two members together.

In the accompanying drawings, wherein like parts refer to like numbers wherever they occur:

FIG. 1 is a side elevational view of the device installed;

FIG. 2 is an enlarged fragmentary elevational view of the device applied to pipe sections;

FIG. 3 is a sectional view taken along line 3—3 of FIG. 2;

FIG. 4 is a fragmentary sectional view taken along line 4—4 of FIG. 3; and

FIG. 5 is an exploded perspective view of the device.

The present invention is used to repair the joint between an L-pipe member 10 fixed into the wall 11 of a house and a J-shaped trap member 12 attached to a lavatory plumbing fixture 13 or a sink. The repair kit 14 is shown installed in FIG. 1.

The L-member 10 is provided with a seal flange 15 and is adapted to slip inside the J-shaped member 12. The J-shaped member 12 is provided with a seal engaging edge 16 and has an external threaded surface 17 adjacent to the edge 16.

A gasket seal 18 is positioned between the under surface of the flange 15 and the edge 16 on the J-shaped trap member 12. The foregoing structure is conventional in all lavatory and sink plumbing arrangements and the present invention as hereinafter explained is provided to enable a plumber or home owner to easily repair the joint between the fixed pipe 10 and the sink trap pipe 12 without having to remove the fixed pipe 10 from the wall 11 or cut the fixed pipe 10.

To this end, a split ring 19 is provided. The split ring member 19 is composed of members 19a and 19b and is provided with an internal shoulder or edge 20 adapted to engage the upper surface of the seal flange 15 on the fixed pipe 10. The split ring 19 also is provided with external threads 21 which are of the same diameter and pitch as the threads 17 on the J-shaped member 12. The split ring member 19b is provided with keys 22 so that it can be readily assembled to the split ring member 19a in engaged position around the fixed pipe 10. The keys 22 are so positioned that the external threads 21 are perfectly aligned.

The second member of the present assembly is an internally threaded coupling ring or nut 23 having threads 24 adapted to engage the threads 21 on the split ring 19 and the threads 17 on the trap pipe 12.

In order to repair a joint between the permanently attached sanitary L-drain pipe 10 and the trap pipe 12, normally the gasket seal 18 is replaced; the split ring 19 is positioned around the fixed pipe 10 and the keying means 22 are engaged; the coupling ring 23 is threaded onto the split ring 19 until the ring engages the external shoulder 25 on the split ring 19; the pipe sections 10 and 12 are engaged so that the gasket seal is between the flange 15 of the fixed pipe 10 and the edge 16 of the trap pipe 12; and the coupling ring 23 then is threaded onto the standard J-trap 12, and when turned tight the gasket 18 provides a water-tight seal between the pipes 10 and 12.

It is contemplated that the repair means 14 can be molded of any die cast metals or hard plastics, or may be machined of any other suitable materials.

Thus, it is seen that the present invention provides a device which achieves all of the objects and advantages sought therefor.

This invention is intended to cover all changes and modifications of the example of the invention herein chosen for purposes of the disclosure, which do not constitute departures from the spirit and scope of the invention.

What I claim is:

1. A sanitary trap jamnut repair assembly comprising:
   (a) a split ring having external threaded portions, said ring adapted to encircle a plumbing pipe adjacent to a flange on the pipe and having an edge adjacent to the threads, said edge being aligned with the pipe flange, engaging means on the split ring portions which align and retain the ring portions in alignment when engaged, (b) a solid annular nut having internal threads matching the external threads on the split ring and external threads on a second plumbing pipe, said second pipe being substantially aligned with the first plumbing pipe and having an edge aligned with the first pipe flange, (c) seal means trapped between the flange and the edge of the nut, (d) and tool engaging means on the split ring and on the nut to independently rotate the said ring and nut.

2. The structure of claim 1 wherein the first plumbing pipe is a sanitary L fixed to a structural member and the second pipe is a standard trap J bend having the same thread size as the threads on the split ring and the nut.

References Cited

UNITED STATES PATENTS

| | | | |
|---|---|---|---|
| 441,691 | 12/1890 | McClellan | 4—206 |
| 609,509 | 8/1898 | Jensen | 4—191 |
| 1,017,813 | 2/1912 | Schuermann | 4—191 |
| 2,552,768 | 5/1951 | Brophy | 4—191 |
| 2,852,034 | 9/1958 | Shames et al. | 4—191 |

FOREIGN PATENTS 10,405  3/1896  Great Britain.

LAVERNE D. GEIGER, *Primary Examiner.*

D. MASSENBERG, *Assistant Examiner.*